US009928378B2

(12) United States Patent
Adir et al.

(10) Patent No.: US 9,928,378 B2
(45) Date of Patent: *Mar. 27, 2018

(54) SENSITIVE DATA OBFUSCATION IN OUTPUT FILES

(71) Applicant: INTERNATIONAL BUSINESS MACHINES CORPORATION, Armonk, NY (US)

(72) Inventors: Allon Adir, Kiryat Tivon (IL); Ehud Aharoni, Kfar Saba (IL); Lev Greenberg, Haifa (IL); Roza Miroshnikov, Vaughan (CA); Asaf Polakovski, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/291,618

(22) Filed: Oct. 12, 2016

(65) Prior Publication Data

US 2017/0147831 A1  May 25, 2017

Related U.S. Application Data

(63) Continuation of application No. 14/945,878, filed on Nov. 19, 2015, now Pat. No. 9,501,654.

(51) Int. Cl.
*G06F 21/62* (2013.01)
*G06F 21/60* (2013.01)

(52) U.S. Cl.
CPC ........ *G06F 21/6218* (2013.01); *G06F 21/602* (2013.01); *G06F 2221/2107* (2013.01)

(58) Field of Classification Search
CPC .................. G06F 21/60; G06F 8/70
See application file for complete search history.

(56) References Cited

U.S. PATENT DOCUMENTS

| 6,631,482 | B1* | 10/2003 | Marks ..................... G06F 21/62 |
| | | | 714/38.14 |
| 7,788,235 | B1 | 8/2010 | Yeo |
| 9,063,766 | B2 | 6/2015 | Chow et al. |
| 9,501,654 | B1 | 11/2016 | Heil et al. |
| 2014/0310679 | A1* | 10/2014 | Bhattacharya ........ G06F 11/362 |
| | | | 717/102 |

(Continued)

OTHER PUBLICATIONS

Duelafn (RFC: SecureString Obfuscated / masked strings except when you need them, Jul. 19, 2011, 19 pages).*

(Continued)

*Primary Examiner* — Oleg Korsak
(74) *Attorney, Agent, or Firm* — Cantor Colburn LLP; David Quinn

(57) ABSTRACT

Embodiments include method, systems and computer program products for protecting sensitive data. Aspects include accessing computer readable program instructions having one or more output commands. Aspects also include locating the one or more output commands in the computer readable program instructions. Aspects also include identifying target output variables and output constants in the one or more output commands. Aspects also include modifying the computer readable program instructions to append one or more obfuscate commands to the target output variables.

5 Claims, 6 Drawing Sheets

(56) References Cited

U.S. PATENT DOCUMENTS

2015/0302206 A1   10/2015   Averdunk et al.

OTHER PUBLICATIONS

Torjo (From compile-time constants to runtime constants and back, TechRepublic, Oct. 29, 2003, 9 pages).*
List of IBM Patents or Patent Applications Treated as Related; (Appendix P), Date File—Mar. 20, 2017, 2 pages.

* cited by examiner

SENSITIVE DATA OBFUSCATION IN OUTPUT FILES

DOMESTIC PRIORITY

This application is a continuation of U.S. application Ser. No. 14/945,878 entitled "SENSITIVE DATA OBFUSCATION IN OUTPUT FILES," filed Nov. 19, 2015, which is incorporated herein by reference in its entirety.

BACKGROUND

The present invention relates to protection of sensitive data, and more specifically, to methods, systems and computer program products for obfuscating sensitive data in computer output files.

Computer software tools commonly generate output files, including log files. Many such software tools access sensitive data, which could also be replicated or represented in the output files of such software tools. Log files, for example, can be used to track tool operation and can assist with debugging in case of failure. Log files and other output files that contain or reflect sensitive data could call for extra considerations before such files can be provided to personnel for review. For instance, log files containing sensitive information could call for a particular security clearance prior to review, which could limit the available personnel available for debugging and related operations. In addition, sensitive company information might be contained in a log file, which could complicate review of the log file by third party external support teams. Moreover, output files, such as log files, can be lengthy making manual removal of sensitive data cost-prohibitive and time-prohibitive. Also, some software tools are required to not expose any sensitive information in their output files. However testing such software tools to ensure they comply with such requirements is very difficult, potentially resulting in some instances of non-compliance, such as failure to excise sensitive information in error handling messages during the testing phase.

SUMMARY

According to an embodiment of the present invention, a method for protecting sensitive data is provided. The method includes accessing computer readable program instructions having one or more output commands. The method also includes locating one or more output commands in the computer readable program instructions. The method also includes identifying target output variables and output constants in the one or more output commands. The method also includes modifying the computer readable program instructions to append one or more obfuscate commands to the target output variables.

In accordance with another embodiment, a computer program product for protecting sensitive data includes a non-transitory storage medium readable by a processing circuit and storing instructions for execution by the processing circuit for performing a method. The method includes accessing computer readable program instructions having one or more output commands. The method also includes locating the one or more output commands in the computer readable program instructions. The method also includes identifying, by the processor, target output variables and output constants in the one or more output commands. The method also includes modifying, by the processor, the computer readable program instructions to append one or more obfuscate commands to the target output variables.

In accordance with another embodiment, a processing system for protecting sensitive data includes a processor in communication with one or more types of memory. The processor is configured to access computer readable program instructions having one or more output commands. The processor is also configured to locate the one or more output commands in the computer readable program instructions. The processor is also configured to identify target output variables and output constants in the one or more output commands. The processor is also configured to modify the computer readable program instructions to append one or more obfuscate commands to the target output variables.

DETAILED DESCRIPTION

In accordance with exemplary embodiments of the disclosure, methods, systems and computer program products for protecting sensitive data are provided.

Figure 1:
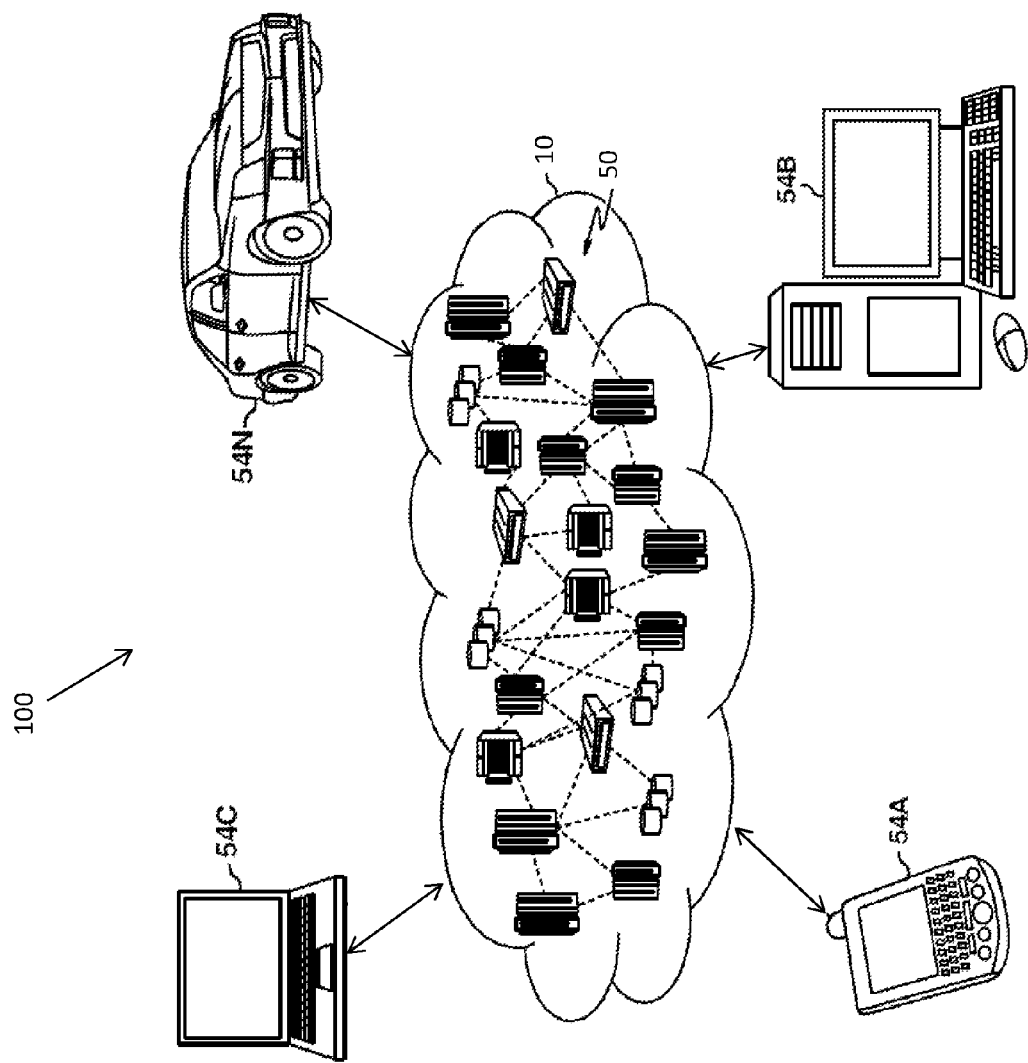
FIG. 1 illustrates a cloud computing environment capable of supporting core logic included in a mobile device data allocation system according to a non-limiting embodiment.

With reference now to FIG. 1, a cloud computing environment 10 capable of supporting the teachings herein is illustrated according to a non-limiting embodiment. As shown, cloud computing environment 10 comprises one or more cloud computing nodes 50 with which local computing devices used by cloud consumers, such as, for example, personal digital assistant (PDA) or mobile device 54A, desktop computer 54B, laptop computer 54C, and/or automobile computer system 54N may communicate. The nodes 50 may communicate with one another. They may be grouped (not shown) physically or virtually, in one or more networks, such as Private, Community, Public, or Hybrid clouds as described hereinabove, or a combination thereof. This allows cloud computing environment 10 to offer infrastructure, platforms and/or software as services for which a cloud consumer does not need to maintain resources on a local computing device. It is understood that the types of computing devices 54A-N shown in FIG. 2 are intended to be illustrative only and that computing nodes 50 and cloud computing environment 10 can communicate with any type of computerized device over any type of network and/or network addressable connection (e.g., using a web browser).

Figure 2:
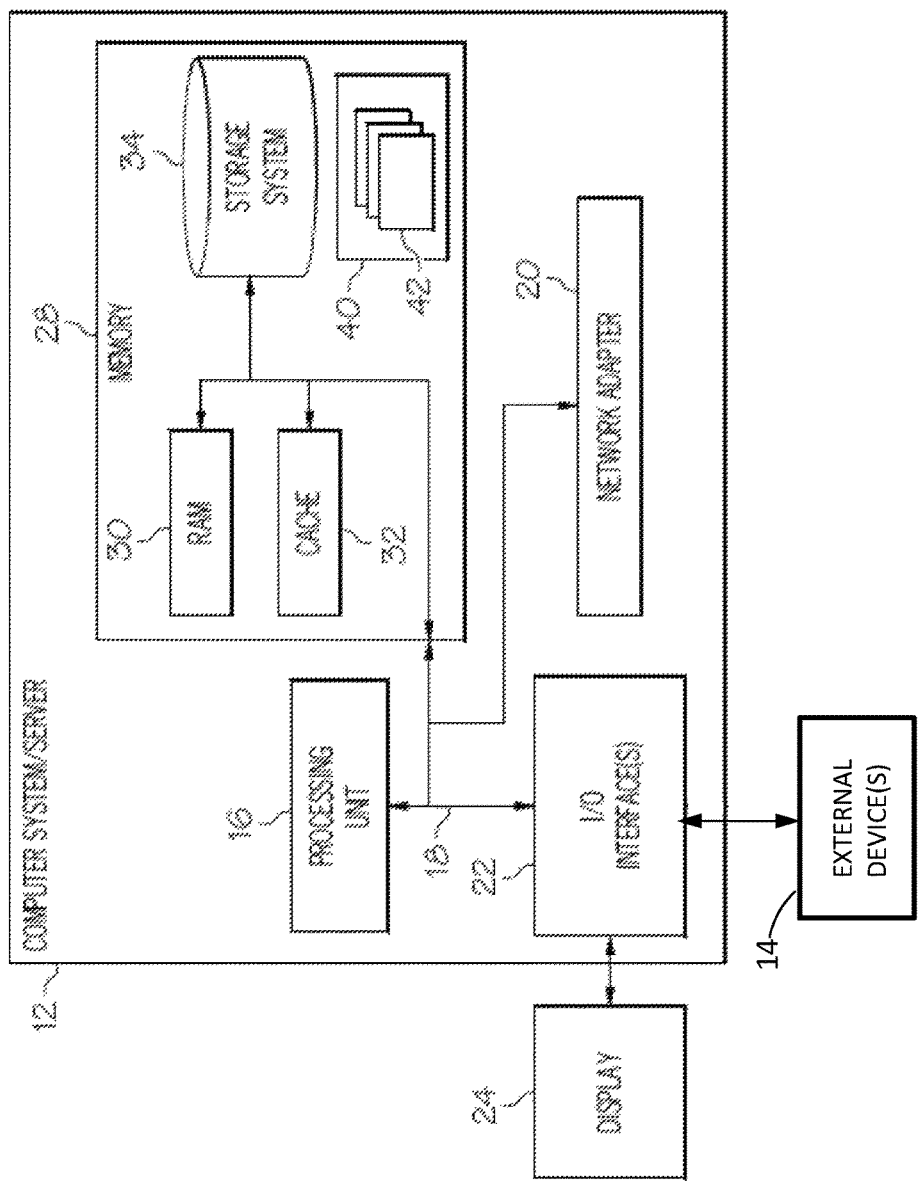
FIG. 2 is a schematic diagram of a cloud computing node included in a distributed cloud environment.

Referring now to FIG. 2, a schematic of a cloud computing node 50 included in a distributed cloud environment or cloud service network is shown according to a non-limiting embodiment. The cloud computing node 50 is only one example of a suitable cloud computing node and is not intended to suggest any limitation as to the scope of use or functionality of embodiments of the invention described herein. Regardless, cloud computing node 50 is capable of being implemented and/or performing any of the functionality set forth hereinabove.

In cloud computing node 50 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 2, computer system/server 12 in cloud computing node 50 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
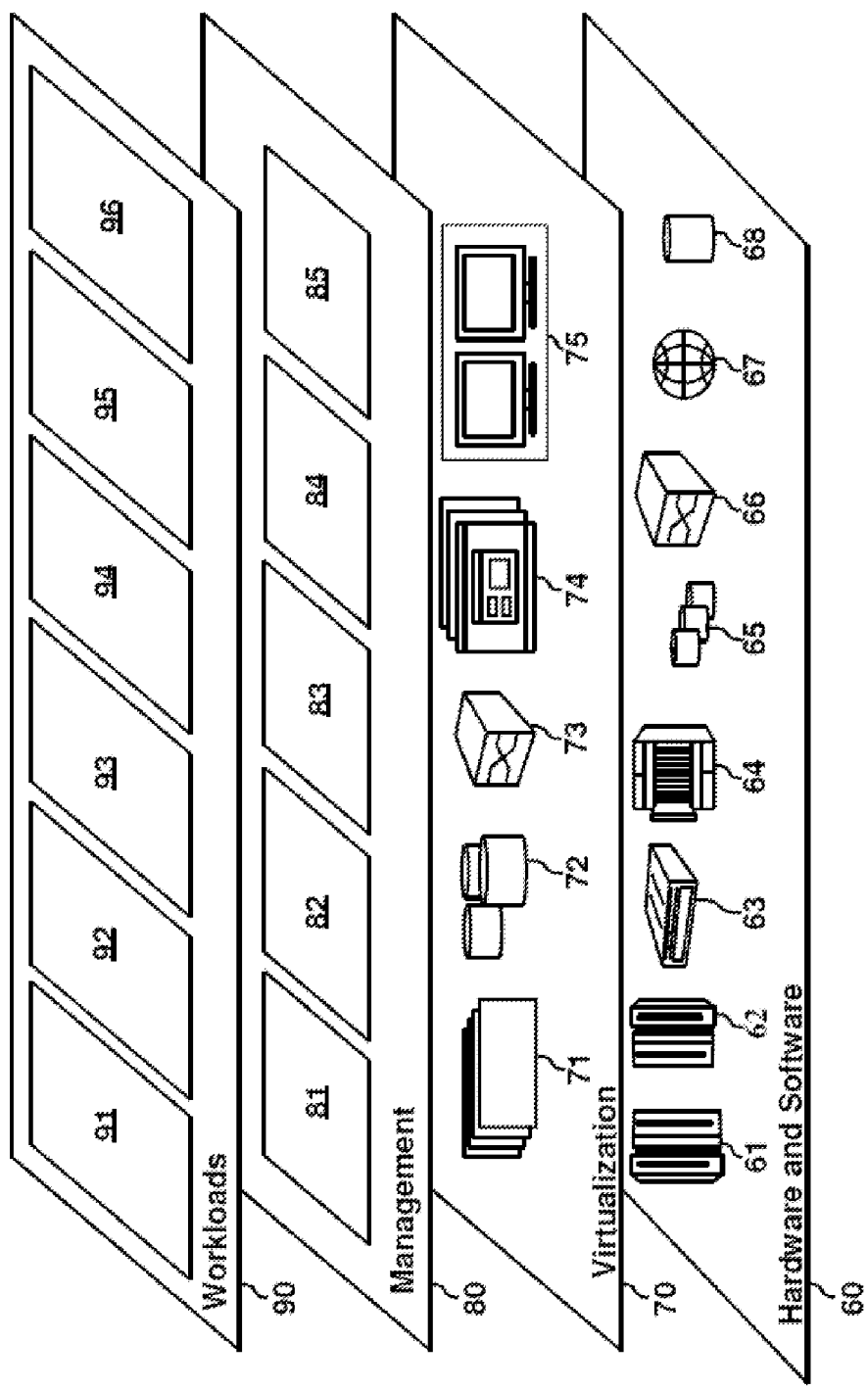
FIG. 3 is a set of functional abstraction layers provided by a cloud computing environment capable of supporting core logic included in a mobile device data allocation system according to a non-limiting embodiment.

Referring now to FIG. 3, a set of functional abstraction layers provided by cloud computing environment 10 is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provided pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

Although a cloud environment capable of supporting the core logic of the data service network system 102 is described in detail above, it should be appreciated that the core logic of the data service network system 102 can reside locally on one or more of the devices 54A-54N. For instance, each mobile device 54A may have installed locally thereon the core logic of the data service network system 102. In this manner, the mobile devices 54 can perform locally the various features and operations of the data service network system 102.

Figure 4:
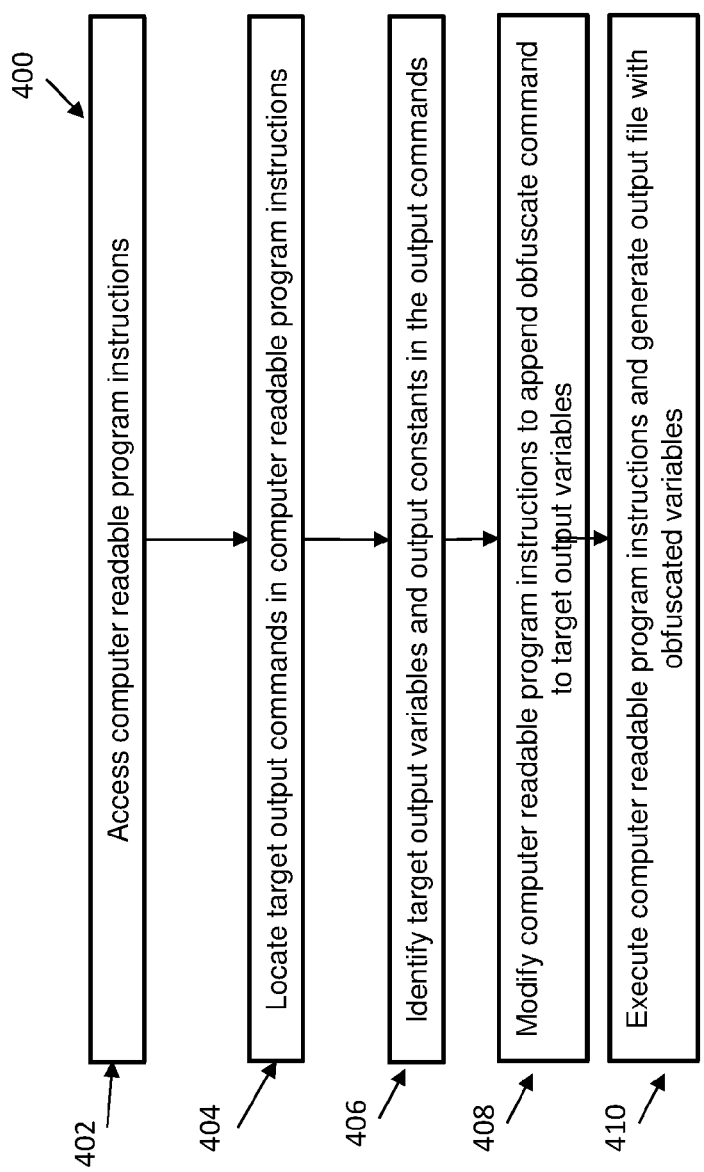
FIG. 4 is a schematic diagram illustrating protection of sensitive data in output files in accordance with an exemplary embodiment.

With reference now to FIG. 4, a flow diagram of a method 400 for protecting sensitive data in accordance with an exemplary embodiment is shown. As shown at block 402, the method 400 includes accessing computer readable program instructions. Next, as shown at block 404, the method 400 includes locating the target output commands in the computer readable program instructions. The method 400 also includes, as shown at block 406, identifying target output variables and output constants in the output commands. Next, as shown at block 408, the method includes modifying the computer readable program instructions to append obfuscate commands to target output variables. As shown at block 410, method 400 can include executing computer readable program instructions and generating an output file with obfuscated variables.

Computer readable program instructions that are accessed can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry.

In a preferred embodiment, the computer readable program instructions are source code. In some embodiments, the computer readable program instructions are binary code.

Output commands in the computer readable program instructions are located and analyzed to distinguish between output variables and output constants. For example, in some embodiments file output commands that target a log file can be automatically identified. The format of output commands can vary depending on the type of computer readable program instructions. For example, file output commands targeting a log file could appear in Java as follows, where the "logger" is the Java type logger, "user" is the output constant and "X" represents an output variable:

logger.info("User"+X+"detected")

In some embodiments, throw exceptions or throw commands can be automatically identified and used to distinguish between output constants and output variables. A throw command can be located where a string is created from constant and dynamic components. For example, a throw exception may appear in Java language as follows:

throw new myException("User"+X+"failed")

Similar commands could be detected in the target binary code. The output commands and throw commands can be used to distinguish between target output variables and output constants. In the above examples, "user" is a constant string and signals an output constant and X is a dynamic string that signals an apparent output variable or an output variable. In some embodiments, data dependencies of an apparent output variable can be followed. In some embodiments, apparent output variables are output constants, for example, when all data dependencies of the apparent output variable lead to constant strings. An exemplary embodiment, where an apparent output variable is an output constant, is depicted in the following string:

If(Y>10) X="hi" else X="bye"

In some embodiments, one or more obfuscate commands are appended to target output variables. In one embodiment, one or more obfuscate commands are appended to all target output variables of the computer readable program instructions. For instance, exemplary strings disclosed above could be modified as follows:

logger.info("User"+obfuscate(X)+"detected")
throw new myException("User"+obfuscate(X)+"failed")

In some embodiments, the computer readable program instructions are further modified to prohibit dependence on exception text. For example, in some cases, a catch clause may have been coded to expect the original pre-obfuscated string and, therefore, such modification can in some embodiments prevent potentially invalid modifications. Alternatively, in some embodiments, if a catch clause has been coded to expect the pre-obfuscated string, a printing of an exception string to a log file is identified and the entire exception string is modified before output to an external file, such as a log file. In some embodiments, for example if modification of an entire exception string would result in an undesirable loss of information, an individual tasked with debugging could use a stack trace to identify a throw command that caused an exception and, thus, also the constant strings involved in a completely obfuscated exception string. Logging an exception can also include a log of a stack trace leading to a throw command, along with line numbers in quoted methods. If method names and line numbers are not sensitive, the stack trace could be left un-obfuscated and available to individuals, for debugging for instance, without concerns of sensitive data disclosure.

In some embodiments, the computer readable program instructions are executed and the obfuscate commands are performed. An obfuscation method can modify an exception string before target variables containing sensitive data are disclosed in an output file, such as a log file. In some embodiments, a compiler can translate a computer readable program code, for example a high-level language program code, into an assembler language or into a machine language. In some embodiments, an obfuscate command causes a compiler to obfuscate one or more of the target output variables in an output file.

In some embodiments, the obfuscate commands do nothing to one or more appended target output variables upon execution of the computer readable program instructions. In this embodiment, an output file can contain the target output variables. In this embodiment, a user with full security, for example, could view an output file containing sensitive data.

In some embodiments, the obfuscate commands perform an obfuscation method that replaces to one or more appended target output variables with an obfuscated constant upon execution of the computer readable program instructions. In this embodiment, an output file can contain the obfuscated constant in place of one or more target output variables. For example, a constant string such as "removed" or "redacted" can replace target output variables, which can contain sensitive data. Thus, a support person with a low security level could, in some embodiments, view an output file, such as a log file, without disclosure of sensitive data.

In some embodiments, the obfuscate commands perform an obfuscation method that hashes one or more appended target output variables upon execution of the computer readable program instructions. In this embodiment, an output file can contain a hashed variable in place of one or more target output variables. Hashing can be useful, for example, when an output file is sent to a support person with a low security level. Hashing can enable a support person to identify the places in an output file containing the same sensitive data without revealing the sensitive data, which could facilitate debugging and related actions. For example:
Logger.info("User"+X+"and User"+Y+"detected")
Would be converted to
Logger.info("User"+hash(X)+"and User"+hash(Y)+"detected")

In that case, for instance, a log file could display "User zxcvasdf and User zxcvasdf," informing a support person that user X and user Y are the same person, but without revealing any sensitive identifiers.

In some embodiments, the obfuscate commands perform an obfuscation method that encrypts one or more appended target output variables upon execution of the computer readable program instructions. In this embodiment, an output file can contain one or more encrypted target output variables. In some embodiments, one or more encrypted target output variables can be decrypted. For example, one or more encrypted target output variables can be decrypted with a key that is selectively in possession of users with defined criteria, such as security clearance or organizational role. In some embodiments, multiple different encryptions can be used in a single set of computer readable program instructions, such that different target output variables can be selectively decrypted with multiple decryption keys. In some embodiments, more than one obfuscate commands comprise at least two different encrypt commands, wherein the at least two different encrypt commands enable selective decryption of the encrypted variables in the output file.

Figure 5:
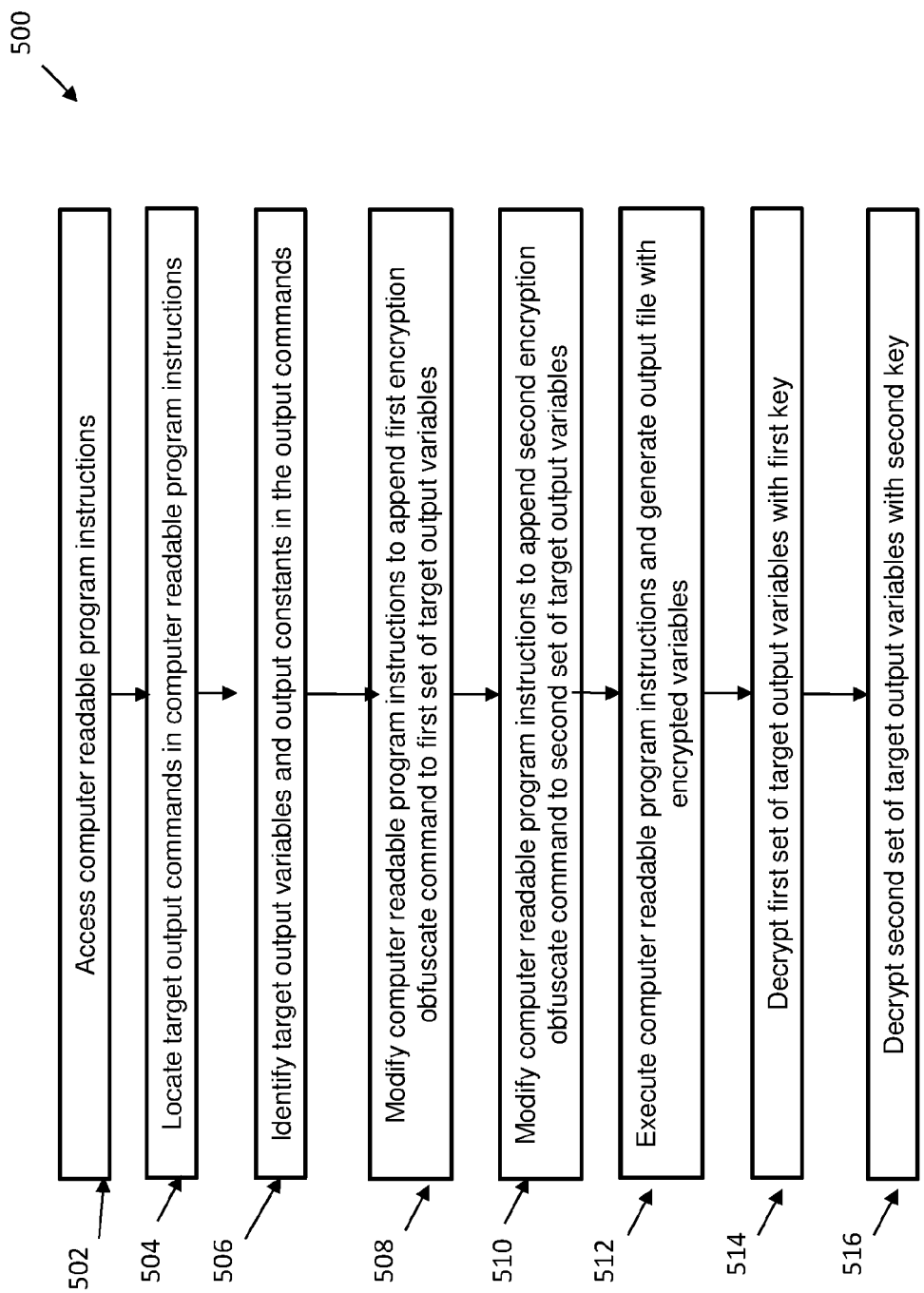
FIG. 5 is a schematic diagram illustrating protection of sensitive data in output files with encryption in accordance with an exemplary embodiment.

With reference now to FIG. 5, a flow diagram of a method 500 for protecting sensitive data in accordance with another exemplary embodiment is shown. As shown at block 502, the method 500 includes accessing computer readable program instructions. Next, as shown at block 504, the method 500 includes locating target output commands in the computer readable program instructions. The method 500 also includes, as shown at block 506, identifying target output variables and output constants in the output commands. Next, as shown at block 508, the method includes modifying the computer readable program instructions to append a first encryption obfuscate command to a first set of target output variables. The method 500, as shown at block 510, includes modifying computer readable program instructions to append a second encryption obfuscate command to a second set of target output variables. The first and second encryption obfuscate commands, for example, upon execution can use different keys to encrypt the target output variables. As shown at block 512, the method 500 includes executing computer readable program instructions and generating an output file, such as a log file, with encrypted variables. In some embodiments, as shown at block 514, the method includes decrypting a first set of target output variables with a first key. In some embodiments, as shown at block 516, the method includes decrypting a second set of target output variables with a second key.

In some embodiments, the obfuscate commands perform an obfuscation method that tags one or more appended target output variables upon execution of the computer readable program instructions. In some embodiments, an output file can obtain one or more tagged output variables. In some embodiments, the tags are replaced with one or more obfuscate commands.

Figure 6:
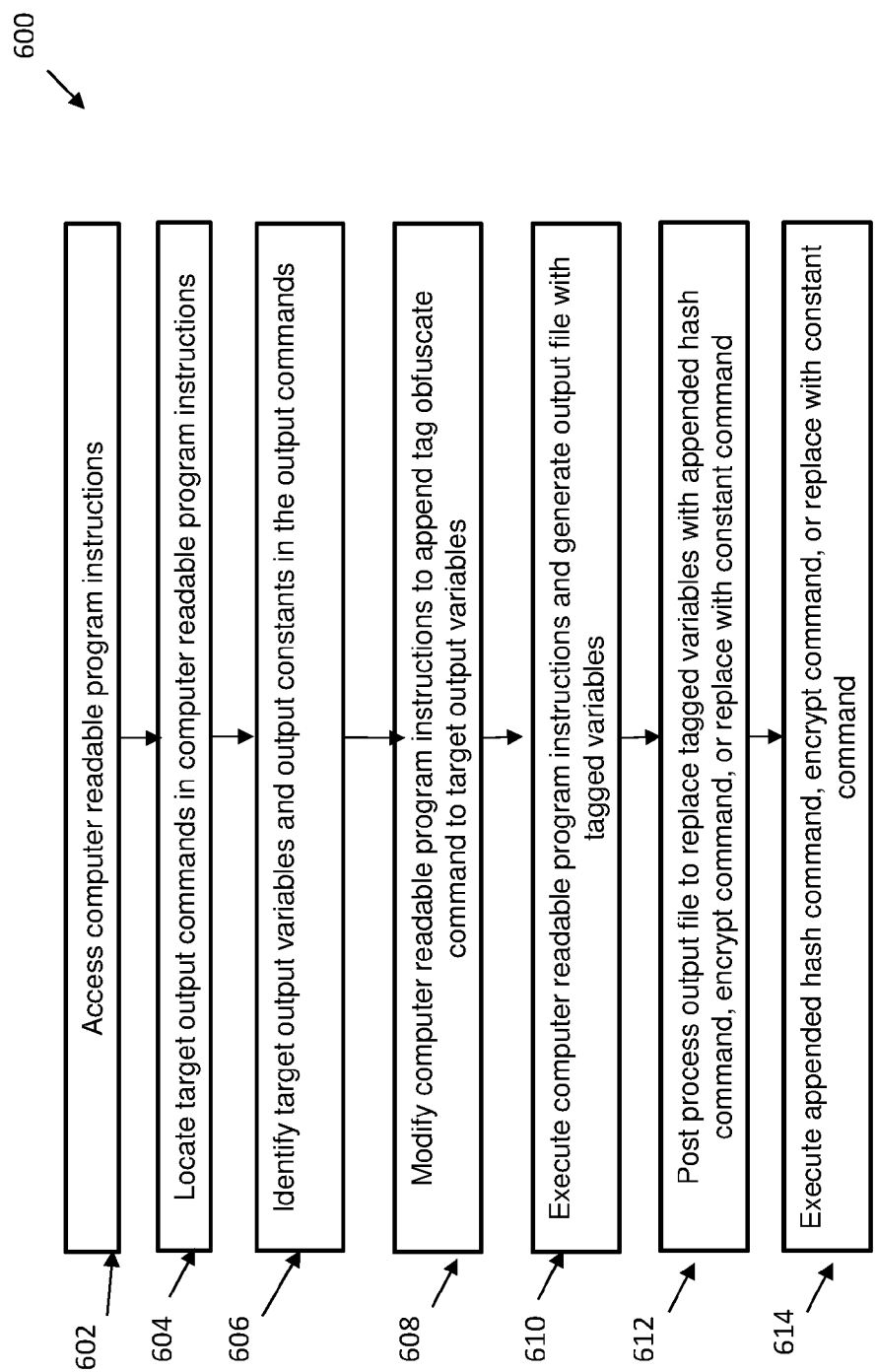
FIG. 6 is a schematic diagram illustrating protection of sensitive data in output files with post processing in accordance with an exemplary embodiment.

With reference now to FIG. 6, a flow diagram of a method 600 for protecting sensitive data in accordance with another exemplary embodiment is shown. As shown at block 602, the method 600 includes accessing computer readable program instructions. Next, as shown at block 604, the method 600 includes locating target output commands in the computer readable program instructions. The method 600 also includes, as shown at block 606, identifying target output variables and output constants in the output commands. Next, as shown at block 608, the method includes appending a tag obfuscate command to target output variables. The method 600, as shown at block 610, includes executing computer readable program instructions and generating an output file, such as a log file, with tagged variables. The method 600, as shown at block 612, includes post processing the output file to replace tag obfuscated variables with appended hash commands, encrypt commands, or replace with constant commands. As shown at block 614, the method 600 next includes executing the appended hash command, encrypt command, or replace with constant command to obfuscate sensitive data.

In some embodiments, the appending is performed in a static analysis. In some embodiments, the appending is performed in a dynamic analysis.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for protecting sensitive data, the computer program product comprising a computer readable storage medium having program instructions embodied therewith, the program instructions executable by a computer to cause the computer to perform a method comprising:

accessing, by a processor, computer readable program instructions having one or more output commands;

locating, by the processor, the one or more output commands in the computer readable program instructions;

identifying, by the processor, target output variables and output constants in the one or more output commands;

modifying, by the processor, the computer readable program instructions to append one or more obfuscate commands to the target output variables; and modifying the computer readable program instructions to prohibit dependence on exception text.

2. The computer program product of claim 1, wherein the obfuscate command comprises a replace command that causes a modified program to replace the target output variable with an obfuscated constant and display the obfuscated constant in an output file.

3. The computer program product of claim 2, wherein the obfuscate command comprises a hash command that causes a modified program to hash the target output variable to produce a hashed variable and display the hashed variable in an output file.

4. The computer program product of claim 3, wherein the obfuscate command comprises an encrypt command that causes a modified program to encrypt the target output variable to produce an encrypted variable and display the encrypted variable in an output file.

5. The computer program product of claim 4, wherein the obfuscate command comprises a tag command that causes a modified program to tag the target output variables to produce tagged variables.

\* \* \* \* \*